United States Patent [19]
Bradley

[11] Patent Number: 5,438,475
[45] Date of Patent: Aug. 1, 1995

[54] PORTABLE COMPUTER WITH AN ELECTRONIC PEN STORAGE TURRET

[75] Inventor: Paul E. Bradley, Woodside, Calif.

[73] Assignee: Hewlett-Packard Company, Palo Alto, Calif.

[21] Appl. No.: 129,811

[22] Filed: Sep. 30, 1993

[51] Int. Cl.⁶ .......................... H05K 5/02; H05K 7/16; G06f 1/16
[52] U.S. Cl. .................................................... 361/683
[58] Field of Search .................................... 364/708.1; 361/680–687; 312/223.2; D14/106

[56] References Cited

U.S. PATENT DOCUMENTS 5,260,867 11/1993 Maeser et al. ............... 364/708.1 X Primary Examiner—Michael W. Phillips
Attorney, Agent, or Firm—Howard R. Boyle; Roland I. Griffin

[57] ABSTRACT

A portable computer convertible between using a keyboard or an electronic pen to input data is provided with an electronic pen holder. This pen holder rotates to provide easy access to the electronic pen when the computer is configured for either keyboard or pen input. In addition, the pen holder includes pen holding holes for storing the electronic pen vertically when rapid repetitive access to the pen is desired.

5 Claims, 5 Drawing Sheets

PORTABLE COMPUTER WITH AN ELECTRONIC PEN STORAGE TURRET

FIELD OF THE INVENTION

The present invention relates to pen based portable computers. In particular the invention provides an apparatus for retaining an electronic pen inside the computer during transportation and for allowing convenient user access to the pen while the computer is in use.

BACKGROUND OF THE INVENTION

Portable computers have been available for many years. Typically they consist of a small rectangular box with a hinged top that can be opened up to permit viewing of a display and to permit access to a keyboard. These types of computers are often referred to as notebook computers. The display on the notebook computer can be opened to present an optimum reading angle for the user while the user types on the integrated keyboard.

More recently, portable computers have become available which incorporate pen based input devices. These computers use an electronic pen to write data on a display or to select data presented on the display. To use a pen based computer, the computer user holds the electronic pen and writes on the surface of the associated display. The electronics in the pen and computer compute the position of the pen relative to the display and perform the function requested by the user of the computer. The display on a pen based computer needs to be flat to enable the user to write on the display surface conveniently.

Today, portable computers utilizing both keyboard and pen input devices are becoming available. These computers are referred to as convertible computers. One problem created by the mix of input devices is how and where to store the electronic pen.

Prior solutions to the pen problem fall into three general categories: First, make no provision on the computer for pen storage and have the user carry the pen separately. This solution creates a situation where the pen is easily lost. Second, provide a recess in the side of the unit. This solution is difficult for first time users to locate. Third, provide a pen storage recess in the top surface of the computer under the display. This last solution is inconvenient because the pen cannot be stored or retrieved while the unit is closed such as when the computer is being used in the pen input mode.

What is needed in the industry is an apparatus which allows access to the electronic pen while the computer is being used in the pen input mode, with the computer open or closed. Also, the apparatus needs to provide for the retention of the pen when the computer is being transported.

SUMMARY OF THE INVENTION

The present invention is incorporated in an apparatus that allows for the secure storage of an electronic pen during times the computer is being transported. In addition, the apparatus allows for easy access to the electronic pen while the computer display is in a vertical position or closed on the computer base.

The pen is stored in a recess within a rotating pen turret. A pen locking feature associated with the recess securely holds the pen within the recess. The pen turret rotates through approximately 90 degrees and thereby moves the recess from a horizontal position to a vertical position. In the horizontal position, a pen stored in the recess is easily accessed when the computer display is in a vertical position. When the pen turret is positioned vertically, the pen is easily accessed when the display is closed on the computer. This rotation allows for the easy access of the pen whether the computer display is positioned vertically for keyboard use or in the flat, closed, position for pen use.

The pen turret also includes apertures which allow the pen to be stored in a vertical position when the computer is closed. This feature of the invention provides the computer user with rapid access to the electronic pen for repetitive pen input procedures.

DETAILED DESCRIPTION OF THE INVENTION

The invention will be described with reference to five Figures. Each of the five Figures illustrate aspects of the invention as implemented in a convertible portable computer.

Figure 1:
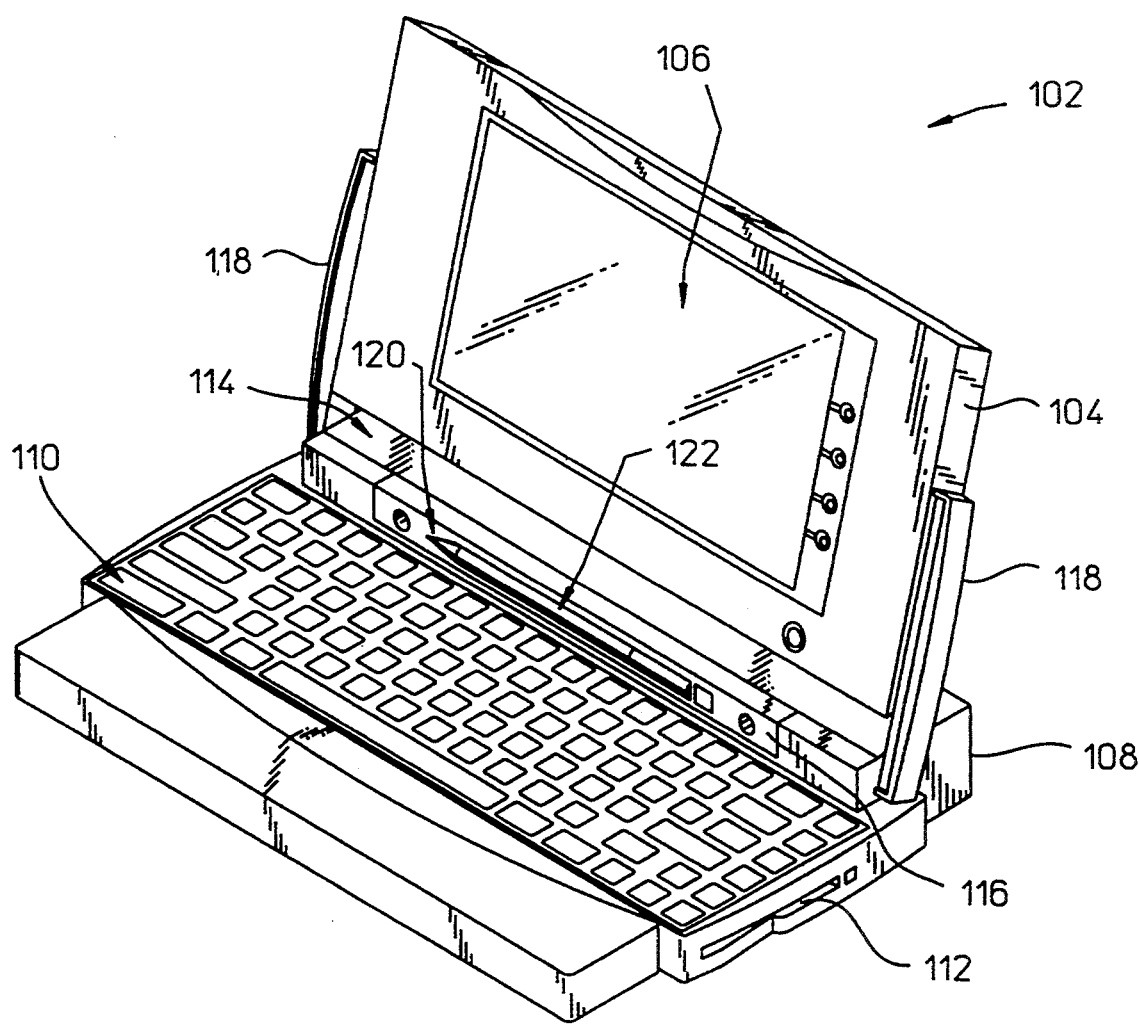
FIG. 1 illustrates a convertible computer configured for keyboard input and incorporating the present invention.

FIG. 1 illustrates a convertible portable computer 102 with a lid 104 and a display 106 attached to the inside of the lid. A base 108 includes an integrated keyboard 110 and a disk drive 112 mounted in the right side of the base. The lid is attached to the base by support arms 118.

Mounted into the top of the upper rear section 114 of the base 108 is a rotating pen turret 116. On one face of the pen turret 116 is a recess 120 to receive an electronic pen 122 shown residing within the recess. The shape of the recess 120 is designed to generally conform to the shape of the electronic pen 122. That is, the recess is generally cylindrical in shape with a triangular shaped section where the tip of the pen fits. The recess is designed such that the pen is retained in the recess. Various retention methods are useable such as designing the recess to provide a frictional fit between the edges of the recess 120 and the pen 122. Other retention methods are known to those skilled in the art.

As shown, the lid of the computer is open and positioned approximately vertical relative to the base of the computer. In this configuration, the computer is arranged for optimal data input by use of the keyboard. The pen turret 116 is orientated such that the recess 120 is horizontal relative to the computer base 108 and the recess is opening inward toward the keyboard 110. This orientation of the pen turret recess allows for access to the electronic pen as required by a user of the computer.

Figure 2:
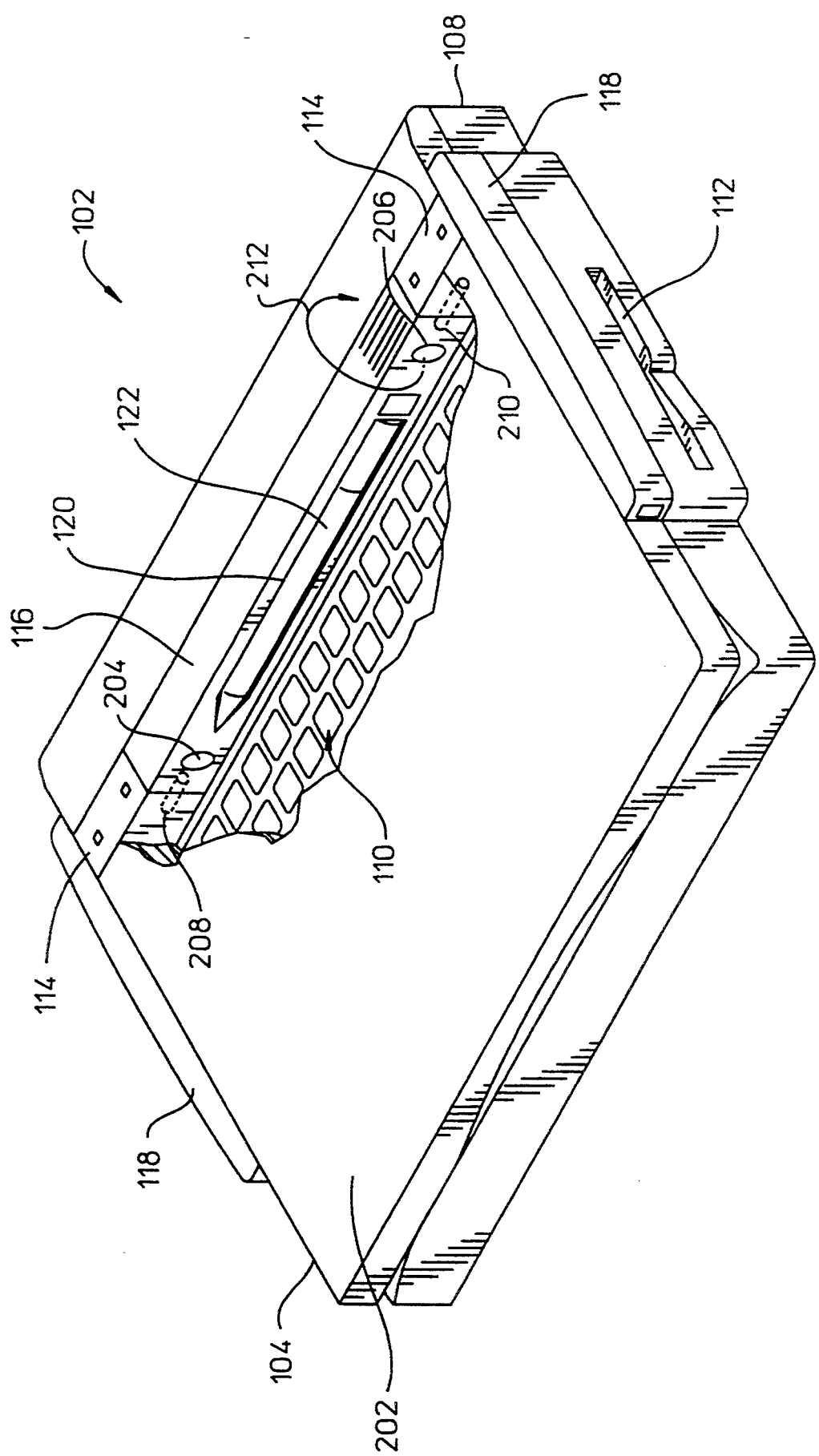
FIG. 2 illustrates the orientation of the pen turret when the computer is configured for transportation.

FIG. 2 illustrates a partial cutaway view of the convertible computer of FIG. 1 with the lid 104 closed on the computer base 108. This is the configuration used to transport the computer. The top 202 of the lid 104 protects the display and the keyboard from damage. As detailed in the cutaway view, the rotating pen turret 116 is positioned as in FIG. 1 with the pen recess opening horizontal to the base and opening toward the keyboard 110.

The rotating pen turret also includes two pen holder holes 204 and 206. Both pen holder holes 204 and 206 are on the same face of the pen turret as the pen recess 120. Two pivot pins 208 and 210, one on each end of the pen turret 116, serve to mount the pen turret to the upper rear section 114 of the base 108. In addition, the two pivot pins allow the pen turret to rotate approximately 90 degrees (illustrated by arc 212) so that the pen recess opening rotates from being horizontal to approximately vertical relative to the base.

Figure 3:
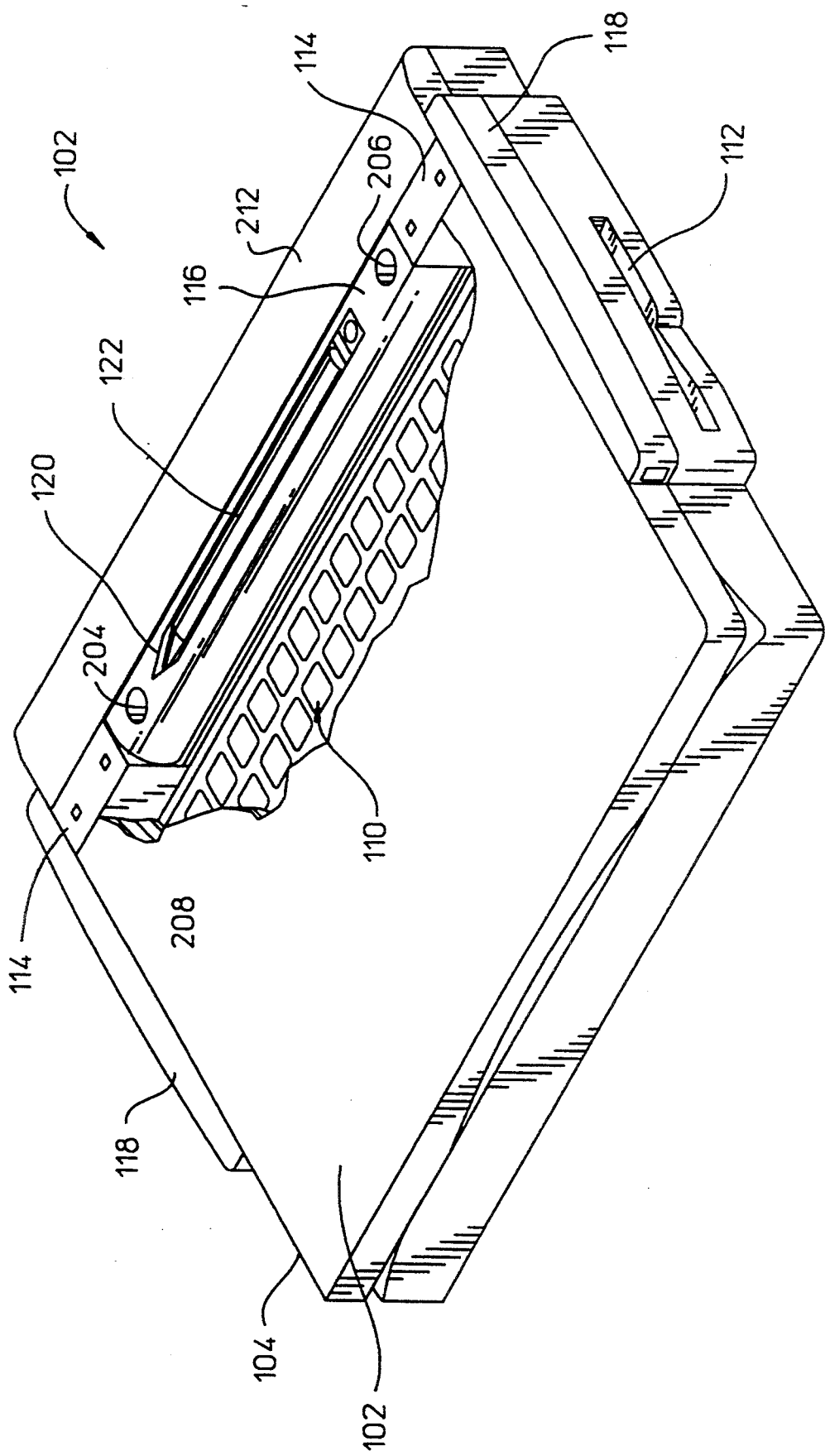
FIG. 3 illustrates the pen turret rotated into a vertical position.

FIG. 3 illustrates a partial cutaway view of the convertible computer described in FIG. 2. However, in FIG. 3, the pen turret 116 is rotated approximately 90 degrees such that the pen recess 120 is facing vertically upward relative to the computer base 108.

With the rotating pen turret 116 in the vertical position, the computer user has access to the electronic pen 122. This arrangement allows for the loading or replacement of the electronic pen 122 while the lid 104 is closed on the base 108.

Figure 4:
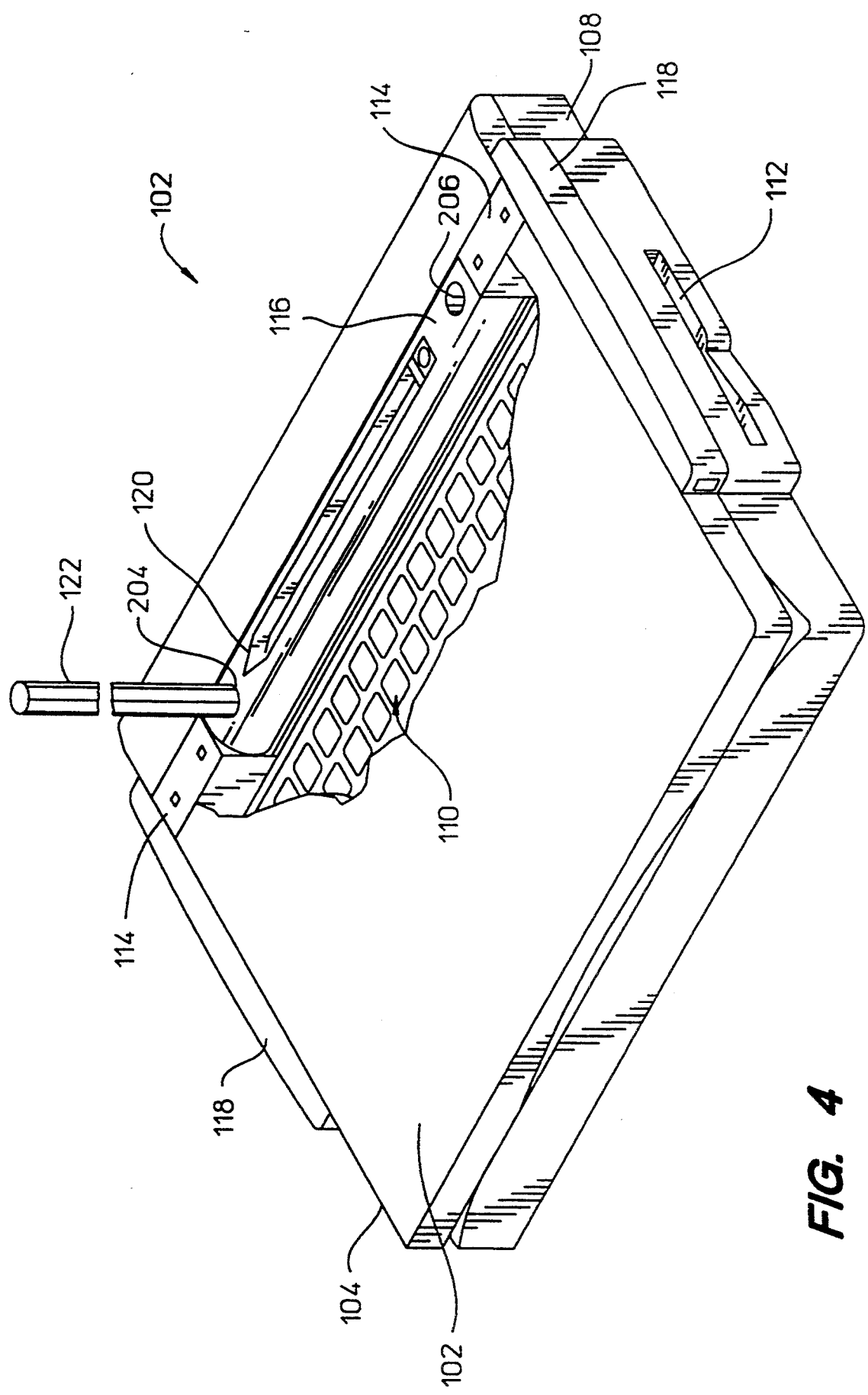
FIG. 4 illustrates the pen turret rotated into the vertical position and an electronic pen stored in a pen holder hole.

FIG. 4 illustrates a partial cutaway view of the convertible computer described in FIG. 3. The electronic pen 122 is shown stored in the left pen holder hole 204. In this position, the pen is easily accessed for repetitive use. While either pen holder hole 204 or 206 can be used to store the electronic pen, a left handed person typically will find the left pen holder hole 204 the most convenient to use while a right handed person will find the right pen holder hole 206 the most convenient to use.

Figure 5:
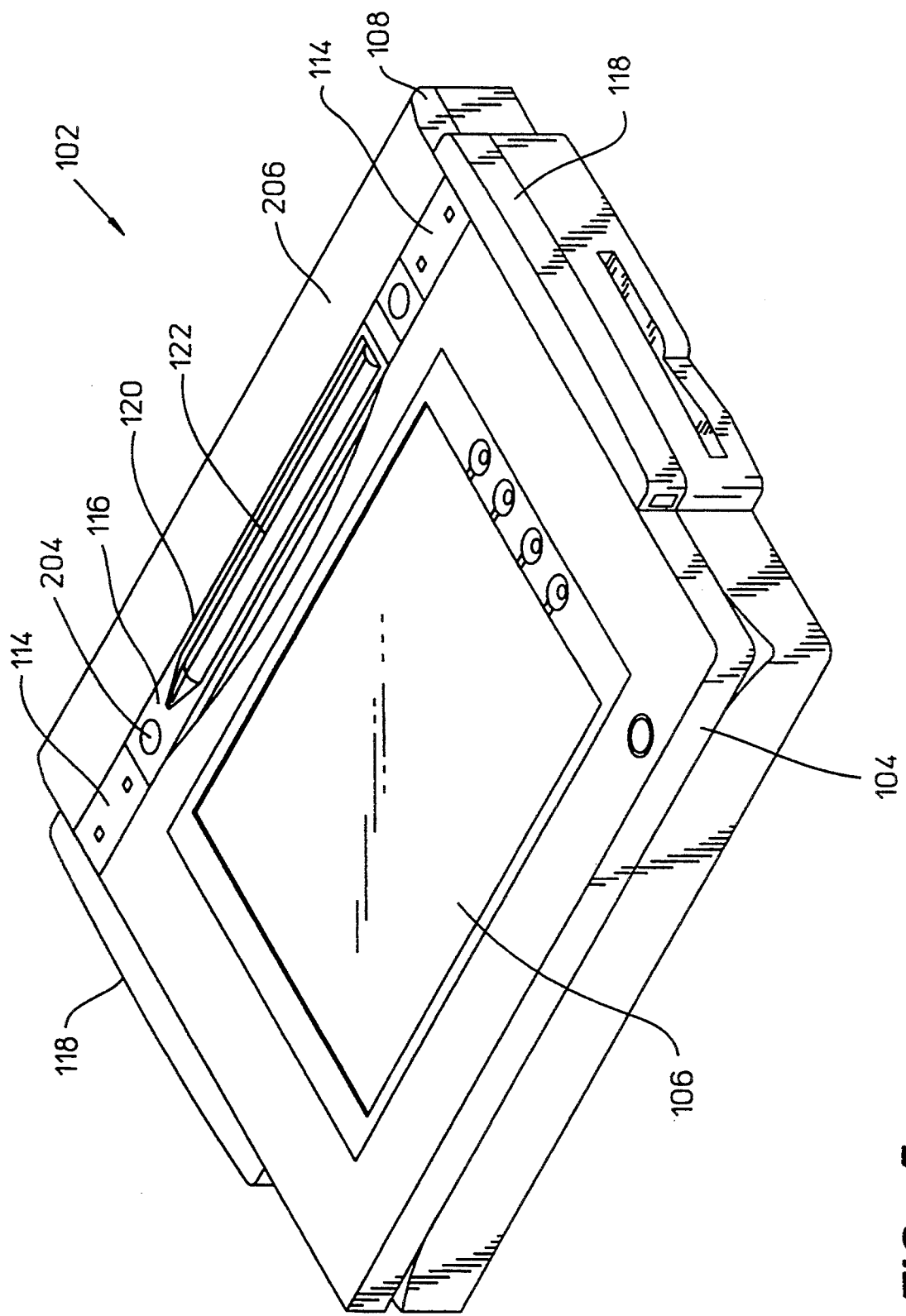
FIG. 5 illustrates the convertible computer configured for pen input with the pen turret oriented into the vertical position.

FIG. 5 illustrates the convertible computer configured for pen input. The lid 104 has been flipped over such that the display 106 is facing upward and provides a flat surface to write on. The pen turret 116 is orientated such that the pen recess 120 opening is facing upward. In this configuration the electronic pen 122 is easily accessible to the computer user.

The novel pen turret allows access to a stored electronic pen no matter how the lid is positioned. So even when the computer is configured for keyboard input operations, the pen can still be accessed and used in association with the display.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A portable computer comprising:
   a housing having a base and a lid closable thereon;
   a rotating pen turret having a pen holding side and the pen holding side having a pen holding recess;
   the pen turret being mounted to the base such that the pen holding side is accessible when the lid is open relative to the housing; and
   the pen turret is mounted to the base such that the pen holding side is accessible when the lid is closed on the base.

2. A portable computer as in claim 1 wherein:
   the rotating pen turret has a longitudinal axis and a left and right end; and
   a first pivotable mounting connects the left end of the pen turret to the base and a second pivotable mounting connects the right end of the pen turret to the base such that the pen holding recess is rotatable from an approximately horizontal position relative to the base to an approximately vertical position relative to the base.

3. A portable computer as in claim 1 wherein the pen holding recess holds an electronic pen.

4. A portable computer as in claim 1 wherein the pen holding recess is shaped to cooperate with an electronic pen such that the electronic pen is retained in the recess.

5. A portable computer as in claim 1 wherein the pen holding side also includes a pen holder hole such that when an electronic pen is inserted into the pen holder hole, with the pen holder hole positioned approximately vertically relative to the computer base, the electronic pen is supported in an approximately vertical position.

* * * * *